FIG:1
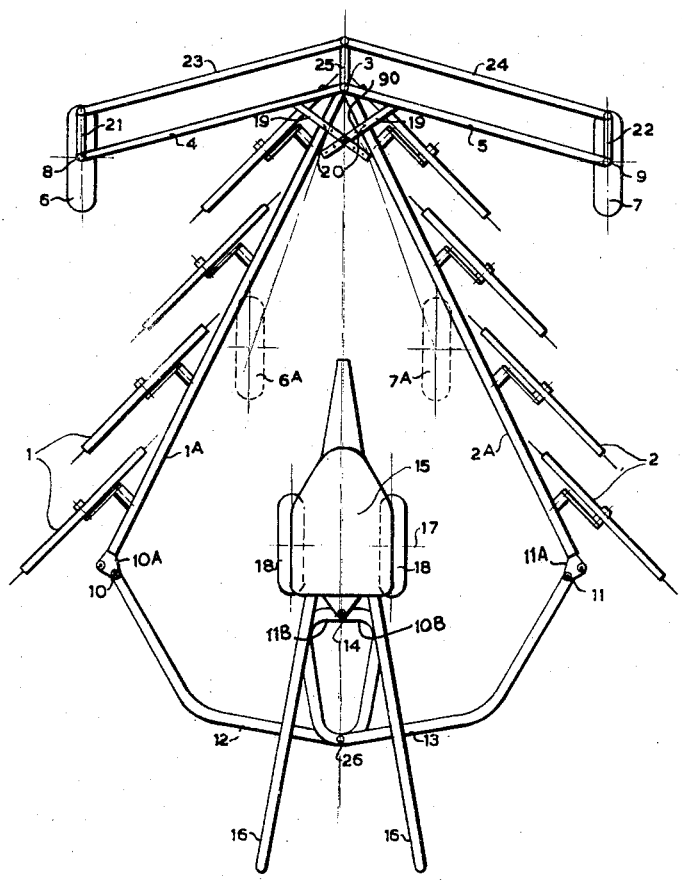

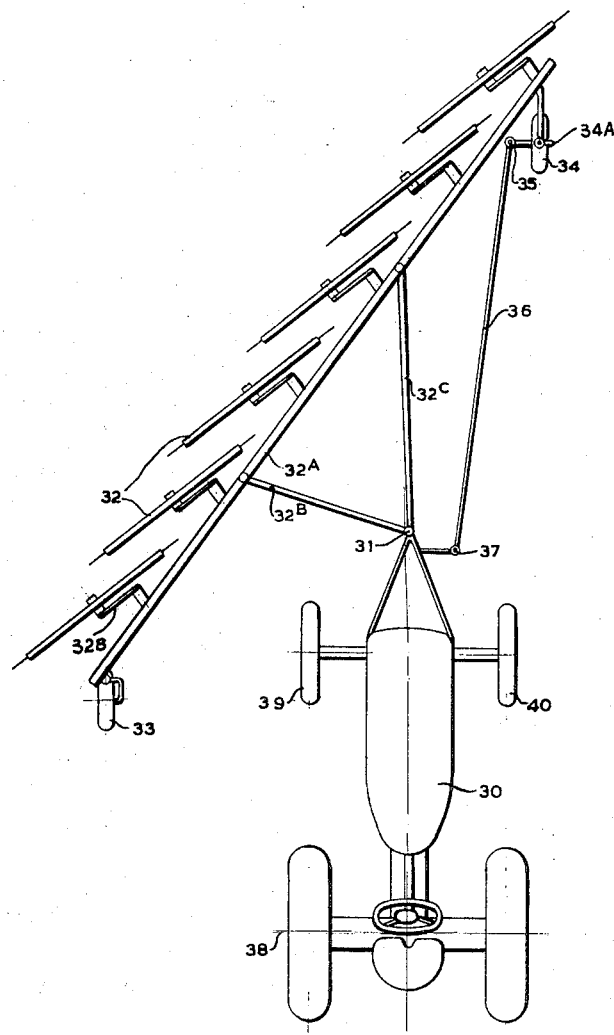

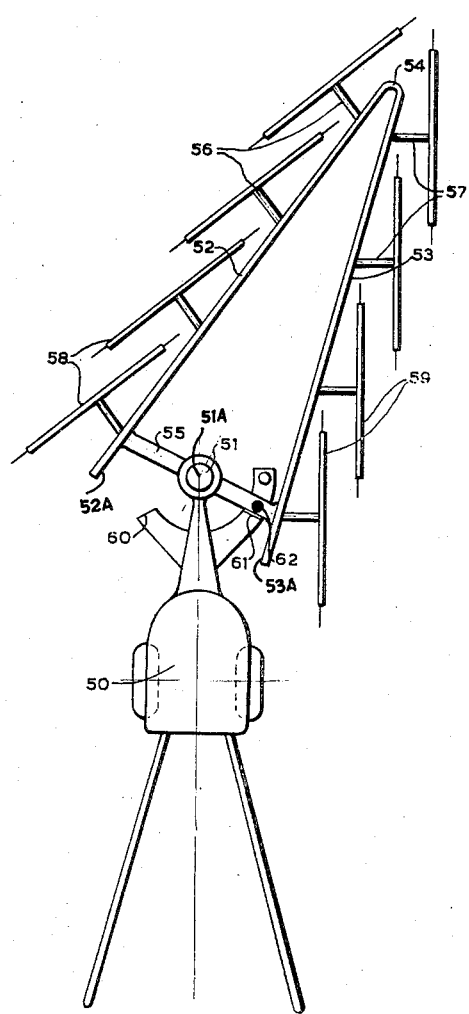
FIG: 3

United States Patent Office 2,851,847
Patented Sept. 16, 1958

2,851,847

SIDE DELIVERY RAKING DEVICE

Cornelis van der Lely and Ary van der Lely, Maasland, Netherlands, assignors to C. van der Lely N. V., Maasland, Netherlands, a Dutch limited company Application August 19, 1954, Serial No. 450,903

Claims priority, application Netherlands August 27, 1953

4 Claims. (Cl. 56—377)

This invention relates to devices for laterally displacing material lying on the ground, the devices each comprising a frame, a plurality of freely rotatable raking members mounted on said frame in oblique relation to the direction of travel of said frame, and a tractor or a similar power actuated mobile frame or vehicle arranged to push forward the rear portion of said frame.

Raking devices of this kind are generally known. In driving said devices straight forward on even terrain and roads no appreciable difficulties are encountered, but when turns are made, the presence of the frame with the raking wheels may greatly impede the directional control and steering of the tractor.

It is a object of the invention to provide a coupling between a frame and tractor which enables the tractor to be easily steered and controlled and to pass through narrow passages. According to the invention the frame is so connected to the tractor as to permit rotation of the frame with regard to the tractor.

With this and further objects, features and details in view, the invention will be hereinafter more fully described with reference to the accompanying drawings, in which some embodiments of the invention are illustrated by way of example and in which:

Fig. 1 shows a device according to a first embodiment of the invention with a substantially V-shaped frame in plan view, Fig. 2 is a plan view of a second embodiment provided with a steerable running wheel, and Fig. 3 shows a very simple third embodiment in plan view.

Referring to Fig. 1 of the drawings, four rake wheels 1 are mounted on a beam 1A and four other rake wheels 2 are mounted to a beam 2A. The rake can be mounted as shown in Pat. No. 2,635,411 of April 21, 1953. The beams 1A and 2A are hingedly connected by pin 3, the inner ends of bars 4 and 5 also being pivotally connected on the vertical axis defined by pin 3. The outer ends of said bars carry running wheels 6 and 7, respectively, in the manner shown in Pat. No. 2,436,475 of February 24, 1948. The axles of the running wheels 6 and 7 are connected to vertical axles 8 and 9 journaled in positions in Pat. No. 2,436,475 at the outer ends of the bars 4 and 5. The rear extremes 10 and 11 of the beams 1A and 2A include hinges 10A and 11A to each of which an arm 12 or 13, respectively (each including three angularly disposed portions), is attached. The other ends 10B and 11B of the arms 12 and 13 are both hingedly connected to a pin 14 located at the rear end of a single-axle or two-wheeled tractor 15 provided with two backwardly directed bars 16. The free ends thereof are held by the driver walking behind the tractor. The tractor 15 includes two wheels 18 mounted on an axle diagrammatically indicated by axis 17 and driven by a motor, and can be used in combination with several different agricultural machines, such as a cutter bar, which machines can be attached to the front of the tractor. The combination of the tractor with such machines per se is known and is not a part of the invention, but the possibility of such combinations is mentioned in order to define the type of tractor which is used. The center of gravity of the tractor 15 is located approximately above the axis 17 and the steering or directional control is effected by means of the free ends of the bars 16.

The bars 4 and 5 are locked in position by means of strips 19 provided with a series of holes 90 and two pins 20 arranged on the beams 1A and 2A and fitting in said holes. Running wheels 6 and 7 can be positioned at 6A and 7A between the beams 1A and 2A, and in order to effect this transformation the pin 3 is loosened. In order to keep the planes of the running wheels 6 and 7 parallel to each other and in position when the positions of bars 4 and 5 are changed, there are connected to the vertical axles 8 and 9 of the running wheels 6 and 7, arms 21 and 22, the free ends of which are connected by means of bars 23 and 24 to the free end of an arm 25 mounted on pin 3. The elements 4, 21, 23 and 25 as well as the elements 5, 22, 24 and 25 constitute parallelograms. The arm 25 is locked in a conventional manner in a position in which it makes equal angles with the beams 1A and 2A.

The points 10 and 11, which are located at equal distances from the point 14, are free to move towards each other along an arc of a circle having pin 14 as its center. If the beams 1A and 2A intersect each other at the desired angle, said freedom of movement may be limited by means of a pin 26 connecting the arms 12 and 13 together.

The illustrated device may be operated in several ways. In the first place it may be used to deliver the material lying on the ground partly to the left and partly to the right. However, the device may be used also to deliver material only in one direction; in this case, when the device is driven in a predetermined direction, either the rake wheels 1 or the rake wheels 2 can be used exclusively. The other rake wheels may be rendered inoperative by lifting them from the ground in conventional manner, or said other rake wheels may be caused to traverse an area of the terrain which has already been worked. If a slope is to be worked, such as the side of a dike, it is only possible to deliver material downwardly. The terrain may then be alternately traversed in opposite directions at substantially the same elevation and the material may be raked in downward direction alternately with the rake wheels 1 and 2. On even terrain, one of the sets of rake wheels 1 and 2 may be detached from the beam 1A or 2A before the raking begins. The directional control of the whole device is effected by steering the tractor 15, whereby, in order to make a turn to the left, it is necessary to move the tractor first temporarily to the right. This steering requires, even on the most difficult terrain, a small physical effort, contrary to the case in which a side delivery rake of large dimensions is mounted in front of the tractor so as to be immovable in lateral direction. A favorable circumstance in the steering of the device according to Fig. 1 resides in the fact that the wheels of the tractor are located in front of the hinge pin 14. If the single-axle tractor is replaced by a two-axle tractor, it will be practically impossible to locate the hinge pin 14 behind the rear wheels of the tractor, but in some cases it may be placed behind the front wheels of the tractor. If the latter is also impossible, the hinge 14 should be located in front of the tractor. In this, the construction shown in Fig. 2 is preferred.

According to Fig. 2, at the front of a two-axle tractor 30 is provided a hinge pin 31 having a vertical axis of rotation, and hingedly connected to said pin is a side delivery rake which is substantially located in front of the tractor. The side delivery rake comprises six rake wheels 32 mounted by means of cranks 32B on a beam 32A. The beam 32A is connected to the hinge pin 31 by two bars 32B and 32C and is supported by two running wheels 33 and 34. The wheel 33 is a self-adjusting or swivel wheel. The horizontal axle 34A of the running wheel 34 is likewise rotatable on a vertical axis, but a point 35 situated on the left hand side of said wheel and rigidly connected to said horizontal axle is connected by means of a rod 36 to a pin 37 located on the right hand side of the hinge pin 31. The rod 36 is pivotable at the pins 35 and 37. Making turns, which on difficult terrain might be very difficult if the wheel 34 had a fixed position, is facilitated by the fact that the position of the wheel 34 depends on the angle between the side delivery rake and the tractor 30. It will be observed that in case of a rigid connection between the rake and the tractor, the running wheel 34 should be self-adjusting, so that no reaction is derived from the lateral pressure of the rake wheels. Since the rake according to Fig. 2 is supported at three points which are not in alignment (i. e. at the running wheels 33 and 34 and at the pin 31), the connection at pin 31 should allow, besides a turning movement about a vertical axis, also some freedom of movement about the longitudinal axis of the tractor. The connection at pin 14 in the device according to Fig. 1 can be without such an additional freedom of movement, but this additional freedom of movement will be preferred in large devices in order to avoid large forces on the structural parts.

According to Fig. 3, a one-axle or two-wheel tractor 50 is provided with a hinge pin 51 having a vertical axis 51A. On said axis is rotatably mounted a small and light rake frame composed of two beams 52 and 53 integral at the common front end 54 and connected together at the rear ends 52A and 53A by a transverse member 55. The beams 52 and 53 each carry four axles 56 or 57, respectively, upon which overlapping rake wheels 58 or 59 are mounted. In this embodiment, the vertical axis of the hinge pin 51 preferably affords the only freedom of movement between the frame and the tractor 50. Abutments 60 and 61 on the tractor serve to limit the rotative movement of the frame to the left or to the right. In each of these extreme positions, the wheel planes of one of the groups of four rake wheels are parallel to the vertical plane passing through the fore and aft center line or longitudinal axis of the tractor. When tractor 50 travels straight forward, one of said positions will be automatically maintained and the obliquely arranged rake wheels (58 in Fig. 3) will deliver the material laterally, whereas the rake wheels having their wheel planes arranged in forward direction (59 in Fig. 3) will merely roll over the ground and to some extent act as running wheels. With this device, it is very easy to work on slanting terrains by travelling to and fro and putting the frame in the alternate extreme positions; due to the small dimensions of the frame, the steering of the device will engender no difficulties. The frame may be also secured in its middlemost position by cooperating means including pin 62. The device may then be used to spread a swath in known manner.

What we claim is:

1. A device for laterally displacing material lying on the ground comprising a power actuated mobile frame, a rake frame attached to said mobile frame and having a set of rake wheels thereon arranged on fixed axes in parallel overlapping relation to an oblique angle to the fore and aft center line of said mobile frame, and a set of ground engaging supporting wheels on said rake frame on fixed axes in parallel relationship to each other and to said center line.

2. A device for laterally displacing material lying on the ground comprising a power actuated mobile frame defining a longitudinal axis, a rake frame operatively associated with said mobile frame, a set of rake wheels operatively associated with said rake frame on one side thereof and arranged with axes having a fixed angular relationship to said rake frame, said rake wheels having an overlapping relationship and being at an oblique angle with regard to the longitudinal axis of the mobile frame, and a set of ground engaging wheels operatively associated with said rake frame on the other side thereof and arranged in parallel relationship to each other and with said longitudinal axis, said ground engaging wheels being in overlapping relationship and defining axes with a fixed angular relationship to said rake frame.

3. A device as claimed in claim 2 comprising a pin pivotally connecting said rake frame to said mobile frame and abutment means operatively associated with said frames for limiting the pivoting of said rake frame to a position whereat said rake wheels are parallel to said longitudinal axis and said ground engaging wheels are oblique to said longitudinal axis for interchanging the functions of the wheels.

4. A device as claimed in claim 3 comprising a pin for limiting the pivoting of the rake frame to a portion whereat all of said wheels are oblique to the longitudinal axis.

References Cited in the file of this patent

UNITED STATES PATENTS

| | | |
|---|---|---|
| 1,974,410 | Coughey | Sept. 26, 1934 |
| 2,436,475 | Jones et al. | Feb. 24, 1948 |
| 2,606,417 | Richey | Aug. 12, 1952 |
| 2,635,411 | Hicks | Apr. 21, 1953 |